United States Patent [19]

Wallace, Jr.

[11] Patent Number: 4,586,971
[45] Date of Patent: May 6, 1986

[54] METHOD OF JOINING HEAT SHRINKABLE CLOSURE MEMBERS

[75] Inventor: Barnie A. Wallace, Jr., Palo Alto, Calif.

[73] Assignee: Raychem Corporation, Menlo Park, Calif.

[21] Appl. No.: 610,557

[22] Filed: May 16, 1984

Related U.S. Application Data

[63] Continuation-in-part of Ser. No. 290,056, Aug. 4, 1981, abandoned, which is a continuation of Ser. No. 172,394, Jul. 25, 1980, abandoned, which is a continuation-in-part of Ser. No. 154,763, May 30, 1980, abandoned, which is a continuation-in-part of Ser. No. 58,743, Jul. 19, 1979, abandoned.

[51] Int. Cl.$^4$ .............................................. B32B 31/26
[52] U.S. Cl. ...................................... 156/85; 156/86; 264/230; 264/342 R; 174/DIG. 8
[58] Field of Search ................ 156/84, 85, 86, 157, 156/215, 218, 272, 334; 138/99; 174/DIG. 8; 264/230, 342 R

[56] References Cited

U.S. PATENT DOCUMENTS

| | | | |
|---|---|---|---|
| 2,450,948 | 10/1948 | Foster | 156/86 |
| 2,474,375 | 6/1949 | Shearer et al. | 156/86 |
| 2,975,091 | 3/1961 | Tobey . | |
| 3,379,218 | 4/1968 | Conde | 138/99 |
| 3,530,898 | 9/1970 | Wilson | 138/99 |
| 3,542,077 | 11/1970 | Muchmore | 138/99 |
| 3,574,313 | 4/1971 | Tanaka | 138/99 |
| 3,677,845 | 7/1972 | Roberts | 156/86 |
| 3,770,556 | 11/1973 | Evans et al. | 156/86 |
| 3,897,295 | 7/1975 | Dowbenko et al. | 156/327 |
| 4,153,747 | 5/1979 | Young et al. | 428/40 |
| 4,200,676 | 4/1980 | Camponigro et al. | 156/86 |

FOREIGN PATENT DOCUMENTS 57271 5/1977 Japan .
1520873 of 0000 United Kingdom .

OTHER PUBLICATIONS

Nitto Electric Industrial Co., Ltd., product literature: "Nitto NEO Cover SW-01" and Nitto NEO Cover RW, undated.
Shaw Pipe Industries, Ltd., Canusa Division, product ad in "Pipeline Industry", Aug. 1978, p. 82.
UBE Industries, Ltd., product literature: "UBE Joint Cover-G", undated, esp., pp. 2 and 31.

*Primary Examiner*—Caleb Weston
*Attorney, Agent, or Firm*—Edith A. Rice; James G. Passe'; Herbert G. Burkard

[57] ABSTRACT

A method of covering a substrate which comprises
(1) overlappingly wrapping a heat-shrinkable polymeric closure member in sheet form around an elongate substrate;
(2) placing a crosslinked polymeric patch member over the exposed edge and outwardly disposed adjacent portions of the sheet in the area of the overlap;
(3) interposing between the closure and patch members a layer of a hot melt adhesive; (4) heating the said hot melt adhesive to its tack temperature and pressing the patch member against the closure member, thereby bonding them together; and
(5) heating the closure member to cause shrinkage thereof into circumferential contact with the substrate to conform generally to the shape of the substrate causing the patch member to stretch by at least 5% in the direction of shrinkage .

the method being carried out under conditions such that (a) said patch member remains bonded to said closure member throughout at at least the major portion of its length in the overlap area; and (b) at least part of said patch member is stretched by at least about 5% up to about 50% in the transverse (circumferential) direction.

20 Claims, 7 Drawing Figures

U.S. Patent    May 6, 1986    Sheet 1 of 2    4,586,971
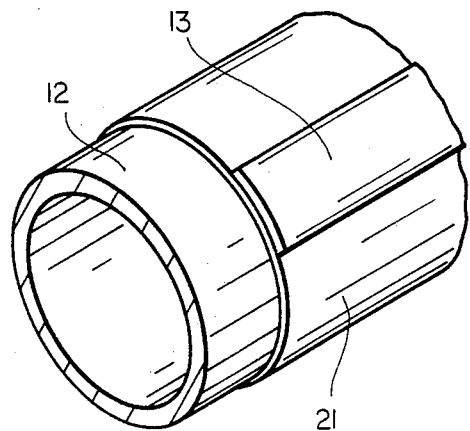
FIG_1
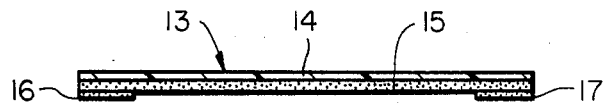
FIG_2
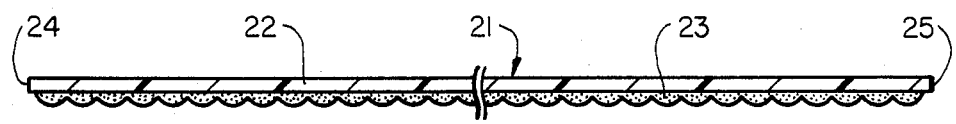
FIG_3

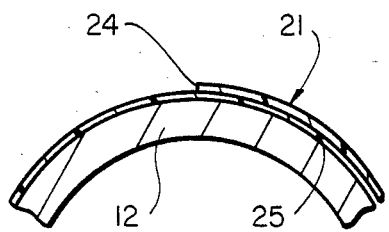
FIG_4
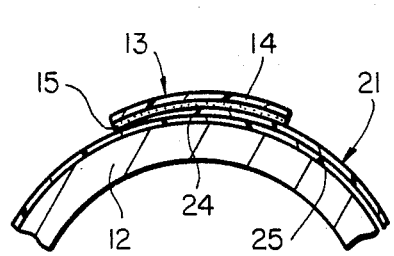
FIG_5
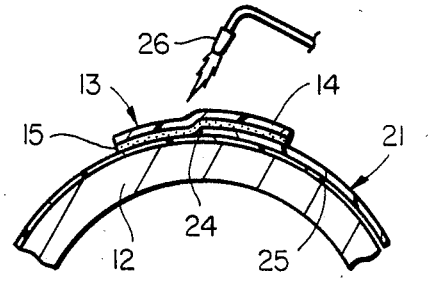
FIG_6
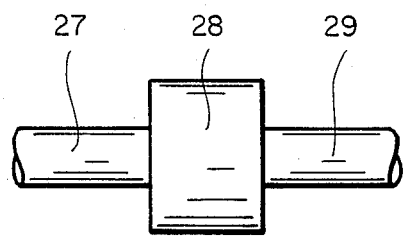
FIG_7

METHOD OF JOINING HEAT SHRINKABLE CLOSURE MEMBERS

CROSS-REFERENCE TO RELATED APPLICATION

This application is a continuation-in-part of Ser. No. 290,056, filed Aug. 4, 1981, abandoned, which is a continuation of Ser. No. 172,394, filed July 25, 1980, abandoned, which in turn is a continuation-in-part of Ser. No. 154,763, filed May 30, 1980, abandoned, which is a continuation-in-part of Ser. No. 058,743, filed July 19, 1979, abandoned, the disclosure of which is incorporated herein by reference.

This invention relates to a method in which a part of an elongate substrate is covered by overlappingly wrapping a heat-shrinkable polymeric sheet or other similar closure member concentrically around the substrate, securing the overlapping edge and the underlying overlapped portion of the sheet together and heating the thereby formed, essentially tubular closure member so that it shrinks into circumferential contact with the substrate.

SUMMARY OF THE PRIOR ART

Many methods of the kind outlined above are known in the art, and reference may be made, for example, to U.S. Pat. Nos. 3,379,218; 3,455,336; 3,530,898; 3,542,077; 3,574,313, 3,770,556 and U.S. Pat. No. 4,200,676, the disclosures of which are incorporated by reference herein. U.S. Pat. No. 3,770,556 discloses a method in which contact adhesive is provided on opposing surfaces of a wrap-around closure member which opposing surfaces contact each other in the wrapped configuration, and a cover sheet, e.g. aluminum foil, fabric tape or heat-shrinkable plastic, is stuck over the exposed outer edge of the closure member to prevent peeling back thereof during the heat-shrinking of the closure. U.S. Pat. No. 4,200,676 discloses a method in which the wrapped edges of the closure member are secured together by means of a multi-layer cover sheet which comprises a polymeric layer and a reinforcing member and which cover sheet has a coating on its inner surface of a cross-linked hot melt adhesive. The cover sheet is placed over the exposed outer edge of the closure member and is then heated and pressed against the closure member to secure the edges thereof together prior to heat-shrinking of the closure member.

While the methods of the prior art outlined above are very useful in a number of situations, all of them suffer from one or more disadvantages, such as the need for specially formed edge portions on the closure member, or the inability to form a consistently reliable closure when the closure member has a high recovery force, or when the substrate has an irregular cross-section (e.g. a transition in a pipe system), or when the substrate diameter is small. In particular, the method of U.S. Pat. No. 3,770,556 poses a problem where a wide range of sizes of substrate must be covered. Since both opposing surfaces of the closure member must be coated with contact adhesive the diameter range of the formed closure is perforce limited. Although such a closure member can, merely because it is heat recoverable, accommodate some variation in the substrate diameter, use of a highly expanded material for the closure member imposes recovery forces beyond that which contact adhesives can generally withstand. In addition, contact adhesives almost invariably have poor peel strength in comparison with hot melt adhesives. Therefore a closure of the type taught by U.S. Pat. No. 3,770,556 would be inappropriate where the closure would be subjected to significant peel forces.

The patch design of U.S. Pat. No. 4,200,676 presents certain difficulties also. First, this patch is of relatively complex and bulky construction because of the added fibers and therefore heats up and cools down relatively slowly and further tends to insulate the underlying adhesive layer. In contrast, the crosslinked patch of the present invention is relatively thin which permits the installer to rapidly bring the underlying hot melt adhesive layer up to tack temperature and further allowing the adhesive to solidify and bond firmly to both patch and closure member promptly following removal of heat, thereby enabling the installer to move on promptly to a further installation. In addition, a major shortcoming of the patch design of U.S. Pat. No. 4,200,676 exists in connection with covering substrates of irregular diameter as in the case where a telephone or high-voltage cable transition or a joint between pipes of different diameter is to be covered. To accommodate such a transition the patch must be able to deform (i.e. stretch) in the areas of greatest stress to thereby more evenly distribute the recovery stress and avoid peeling of the patch away from the closure member. The substantally undeformable patch of the prior art cannot stretch as much as the present invention and hence is subject to pulling away of the closure in regions of high recovery stress such as is caused by a major diametric transition. Likewise, a reinforced patch is unsuitable for substrates of small diameter since its comparative stiffness makes it difficult or impossible for the installer to conformably wrap it around the closure member which, being flexible, does readily conform to the substrate.

SUMMARY OF THE INVENTION

I have now discovered an improved method of covering a part of the length of an elongate substrate which unexpectedly overcomes the shortcomings of the prior art design patch closures and is therefore usable in connection with both very small and unusually large diameter substrates and also with a single substrates of sharply varying diameter. The novel method of the present invention comprises:

(1) overlappingly wrapping a closure member in sheet forms circumferentially around the substrate so that a first marginal portion of said closure member overlaps a second opposing marginal portion of said closure member, at least a part of said closure member being composed of polymeric material which is heat-shrinkable in the circumferential direction;

(2) placing a crosslinked polymeric patch member so that it overlays said first marginal portion and an intermediate portion of said closure member adjacent said second marginal portion, said patch member extending axially along substantially the whole of the edge of said first marginal portion, said patch member having a thickness of 10 to 100 mils, preferably 15 to 30 mils, a modulus at 150° C. of from about 10 to about 200 psi, preferably about 50 to 150 psi, and an elongation at 150° C. of 10 to 1000%, preferably about 50 to 200%;

(3) interposing between said closure and said patch member a layer of hot melt adhesive which has a lap shear strength at 150° C. of from 0.3 to 20 psi, preferably from 1 to 12 psi, a peel strength of at least 5 pli, a melt viscosity at 150° C. greater than $10^2$ poise, preferably greater than $10^4$ poise, and a tack temperature which is less than the recovery temperature of said closure member, preferably less than about 140° C. most preferably less than about 80° C., said adhesive layer being 5 to 100 mils thick, preferably 10 to 2 mils, and preferably being initially present as a layer adherent to said patch member;

(4) heating said layer of adhesive to a temperature at least as high as its tack temperature and then pressing said patch member against said closure member, thereby bonding them together; and (5) heating said closure member to cause shrinkage thereof into contact with said substrate;

the method being carried out under conditions such that (a) said patch member remains bonded to said first and second marginal portions of said closure member throughout its length; and (b) at least a part of said patch member is stretched from about 5% up to about 50% in the transverse direction.

BRIEF DESCRIPTION OF THE DRAWINGS

FIG. 1 is a perspective view of a closure member installed in accordance with the present invention;

FIG. 2 is a view in cross-section of a patch member used in the present invention;

FIG. 3 is a view in cross-section of a mastic or adhesive coated heat-recoverable closure member useful in the present invention;

FIGS. 4, 5 and 6 illustrate the method of the present invention by which the ends of a closure member are joined; and FIG. 7 illustrates a pipe system containing a transition which can be covered by the method of the present invention.

DETAILED DESCRIPTION OF THE PREFERRED EMBODIMENTS OF THE INVENTION

The patch member used in the present invention is preferably of substantially uniform cross-section and composition, and as noted above, preferably has the layer of adhesive initially adherent to it. The cross-linked patch member is composed of a polymeric material, which polymer has been cross-linked, e.g. by irradiation or chemical means, so that it retains strength even when it is heated above its crystalline melting point but can nevertheless stretch. The crosslinked patch is not reinforced. Reinforced patch members of the kind disclosed in U.S. Pat. No. 4,200,676 do not, as heretofore indicated, stretch sufficiently. I have found that if the patch member cannot stretch circumferentially by at least about 5% at any point along its length, and thereby help to accommodate recovery of the closure member and reduce and more uniformly distribute the shear stress on the adhesive layer, the closure member can exert sufficient recovery force at one or more points to slip away from underneath the patch and thereby expose the substrate. Such incomplete covering of the substrate by the closure member is, of course, totally unacceptable. Often at least a part of the patch should stretch by up to about 5% or even more. Preferably no part of the patch should stretch by more than about 50%. Stretching in excess of about 50% is undesirable as it permits the sheet closure to contract during recovery to such an extent that it may no longer overlap and will therefore not fully cover the substrate, i.e. it will leave only the patch itself over a longitudinal band of the substrate which is likewise unacceptable.

When a substrate of varying cross-section is being covered, the patch may stretch only in the area of greatest circumference, and may not stretch at all (or may indeed contract) in other areas. Since the patch will preferably be capable of stretching by at least 5%, it is generally preferred that it should not be heat-shrinkable. However, since the forces generated by recovery of the closure member can overcome forces generated by any tendency of the patch to shrink on heating, it is possible for the patch to be heat-shrinkable. Alternatively, although not preferably, it can be heat-expandable. Since the patch must secure the overlapped portions of the closure member together along substantially the whole length of the closure member overlap, it is preferred that any change in the axial length of the patch during installation should substantially match any change occurring in the axial length of the closure member. Generally, this means that its axial length should remain substantially unchanged during installation. bearing these points in mind it is preferred that the patch member be composed of a polymeric material which, when heated in the absence of restraint, undergoes a maximum dimensional change in the axial and/or circumferential (i.e. longitudinal and/or transverse) direction of $-10$ to $+10\%$, preferably substantially zero. Unrestrained dimensional changes in excess of $\pm 10\%$ are undesirable because if the patch undergoes such change when unrestrained, it tends to curl under along its periphery in use thereby inhibiting good adhesion to the underlying closure member and precluding effective sealing. The thickness of the patch member should preferably be less than the recovered thickness of the closure member and most preferably will be less than the thickness of the closure member before recovery.

I have found that the relationship between the maximum recovery force of the closure member (i.e. the recovery force when shrinkage begins) and the product of the thickness and the hot modulus of the patch member has an important influence on successful operation of the method of the present invention. It is theorized that this is at least in part because this relationship significantly affects the radial forces which press together the overlapping portions of the closure member. When at least part of the interior surface of the first marginal portion and the exterior surface adjacent to the second marginal portion in contact therewith are free from any coating, the heating of the closure member, coupled with the radial component of the recovery forces, may cause melt-bonding of the first and second marginal portions which is particularly desirable in terms of achieving a secure closure. The product of the thickness of the patch member and its modulus at 150° C. is preferably at least 0.2 times but not more than 20 times, more preferably between about 0.5 and 10.0 times the maximum recovery force of the closure member, in order that the patch member be sufficiently compliant and extensible. In carrying out the method of the present invention, it is desirable that in the finished product, the first and second marginal portions of the closure member should remain in overlapping contact with each other throughout their length. Proper correlation of the hot modulus and thickness of the patch with the recovery force of the closure member has an important influence in obtaining this valuable result.

The patch member may have, on the interior surface thereof, one or more areas of pressure-sensitive adhesive which can serve to hold the patch in place until the hot melt adhesive reaches its tack temperature. However the presence of such pressure-sensitive adhesive areas reduces the total strength of the ultimate bond between the patch and closure member, and other means are preferably employed to keep the patch in place.

The axial length of the patch member is determined by the length of the closure member and will preferably be substantially egual to that of the closure member. Virtually any length of closure member can be successfully accommodated using the patch design of the present invention. The wider the patch, the more likely it is to secure together the overlapping portions of the closure member. Typically the width of the patch will be 2 to 10 inches. With substrates of small circumference, especially when the substrate is of irregular cross-section, the optimum width for the patch will be influenced by both the circumference of the substrate and the shrinkage of the closure member. With a substrate having a generally small diameter but having a sharp diametric transition and a closure member with a high recovery force slippage on recovery of the marginal portions of the closure member relative to the patch can occur. This problem is readily rectified by use of a slightly wider patch. For this reason, the increased efficiency of the patch member of the present invention, as compared to those previously taught, is particularly valuable when the substrate to be covered is of small circumference, e.g. no greater than about 20 inches, especially at most 15 inches, and/or of irregular cross-section, e.g. the ratio of the maximum circumference to the minimum circumference is greater than about 2:1. Likewise, when substrates of large diameter (i.e. greater than 16") are to be covered the improved efficiency of the present patch design is a major advantage in that its narrow width in comparison with prior art designs enables rapid heating and installation and reduced material cost.

As heretofore indicated, I have found that adhesives suitable for use in the practice of the present invention are hot melt adhesives, preferably lightly cross-linked to a gel content of at least about 1% most preferably at least about 5%, having: (1) a melt viscosity at 150° C. of greater than $10^2$ poise, preferably greater than $10^4$ poise; (2) a lap shear strength at 150° C. of from 0.3 to 20 psi, preferably 1 to 12 psi; (3) a peel strength of at least 5 pli; and (4) a tack temperature which is less than the recovery temperature of the closure member, preferably less than about 140° C., most preferably less than about 80° C. Some cross-linking of the adhesive is desirable since the ideal adhesive for use in the present invention will become tacky but not flow significantly when heated to above its melting point during recovery of the closure member. Either radiation or chemical crosslinking of the adhesive is suitable. Polyethylene or polyethylene copolymer based adhesives are preferred. Adhesive compositions of the type described in U.S. Pat. No. 4,200,676 and application Ser. No. 798,479 filed May 19, 1977 now U.S. Pat. No. 4,181,775 to Corke are suitable. However, numerous other hot melt thermoplastic adhesives as known in the art to be suitable for bonding different polymers together can appropriately be utilized.

The sheet closure member may be any of the heat-shrinkable polymeric closure members of the type generally known to the prior art which provide a suitable surface for the patch member to adhere to. The present invention encompasses the use of sheet closure members formed by two or more sheet members joined to each other along axially extending bond lines, with at least one of the joints being formed between marginal portions from different closure members by means of a patch member in accordance with the present invention. Good results can be obtained when at least part of the closure member is not heat-recoverable. However, a drawback of a closure member of this kind is that it would be suitable for use only with substrates of a comparatively limited range of circumferential sizes, whereas the preferred procedure in most circumstances is to make use of a uniformly expanded sheet of crosslinked polymeric material such as polyethylene which can be utilized to fit round any size of substrate by merely varying the degree of overlap, which is conveniently 1 to 10 inches. The closure member will normally be 10 to 150 mils thick and have a circumferential expansion ratio of 1.1 to 10, preferably 1.5 to 5, and a modulus at 150° C. of 2 to 200 psi, preferably 30 to 60 psi. Preferably the closure member is uniaxially expanded in the direction transverse to the longitudinal axis of the substrate. The recovery force of the closure member will usually be 0.1 to 20 pli, preferably 1 to 10 pli. It is usually desirable for the closure member to have a coating of an adhesive or mastic on the interior surface of the closure member which interior surface is moved into contact with the substrate when the closure member shrinks. As noted above, the best closure often results when at least part of the interior surface of the first marginal portion which overlaps the exterior surface of the second marginal portion is free from any such coating. However, completely satisfactory results can often be obtained even when the coating of adhesive or mastic covers the whole of the overlap area.

When bonding the crosslinked patch member to the closure member, the patch will normally be heated to a temperature of about 80° to 300° C., generally 110°–150° C.

Referring now to the drawings, FIG. 1 shows a pipe 12 having a closure member 21 recovered about it, with the ends of the closure member secured together by crosslinked polymeric patch member 13. As shown in FIG. 2, the patch member 13 comprises a cross-linked polymeric sheet 14 having a layer 15 of hot-melt adhesive adherent thereto, with marginal portions 16 and 17 of pressure-sensitive adhesive. FIG. 3 is a cross-sectional view of the closure member prior to installation showing cross-linked heatshrinkable polymeric sheet 22 having adherent thereto a layer 23 of adhesive or mastic. FIGS. 4, 5 and 6 illustrate the method of the present invention. As shown in FIG. 4, the closure member 21 is wrapped around the substrate 12 with the marginal portions 23 and 25 overlapping. Then patch 13 is approximately centered over the line formed by the exposed end 23, as shown in FIG. 5. When in place, the panel 13 is heated, for example, by means of a torch 26 as shown in FIG. 6 or by other suitable heating means, to render the adhesive 15 tacky and is then pressed into firm contact with the closure member 21. Finally the exposed exterior surface of the closure member is heated to cause recovery thereof. FIG. 7 illustrates a typical transition in a pipe system of the kind referred to in the Exampes below.

The following Examples, in which all percentages are by weight illustrate the invention. The term length connotes the dimension of the patch or closure member which is parallel to the longitudinal axis of the substrate when applied while width is the dimension transverse to the substrate longitudinal axis. Both the patch and the closure member are ordinarily extruded in sheet form with the width of the sheet as extruded being the length of the patch or closure when applied to the substrate. Closure members in accordance with the present invention are ordinarily supplied in rolls from which the installer cuts off the desired length to obtain a closure suitable for the diameter of the substrate.

EXAMPLE 1

The patch member used in this Example is 18 inches long and 6 inches wide and consists of a 20 mil thick sheet of cross-linked high density polyethylene having a modulus at 150° C. of 110 psi and having adherent to one surface thereof a layer 25 mils thick of a lightly crosslinked hot melt adhesive. The patch member is made by coating, onto a sheet of high density polyethylene which has been cross-linked by irradiation to an initial modulus at 150° C. of 35 psi, a layer of an adhesive composition comprising 72.82% of an ethylene/ethyl acrylate (DPD 6181) copolymer containing about 20% of ethyl acrylate, 24.27% of a tackifier (Nevpene 9500), 1.94% of an antioxidant (Irganox 1010-tetrakis [methylene 3-(3',5'-di-tert-butyl-4'-hydroxyphenyl)propionate]methane) and 0.97% of a radiation cross-linking promoter (triallyl isocyanate), and then irradiating the adhesive coating (and the patch together) to a dosage of 10 megarads.

The closure members used in this Example comprise uniaxially uniformly expanded sheets of cross-linked high density polyethylene, 18 inches long. Table I below shows the modulus at 150° C., the expansion ratio and the thickness before expansion of each of the sheets. The sheets have a coating 60 mils thick of a mastic on one surface thereof.

The substrate used in this Example consists of a steel pipe having a concrete lining ⅜ inch thick. The pipe has an outer diameter of 8 inches and the thickness of the steel is ¼ inch. Mounted concentrically on the center of the pipe, is a steel collar 4 inches long having an outer diameter of 14 inches. The closure member is wrapped around the substate, with the mastic coating on the inside and with the collar in the middle of the sheet, and with an overlap of about 4 inches. The patch is then placed symmetrically over the exposed edge of the sheet and heated by means of a flame gun until the patch adhesive had reached its tack point and bonded the patch to the sheet; the patch is pressed against the sheet by hand using an insulated glove during the heating.

The exposed surface of the remainder of the sheet is then heated to cause recovery thereof. Table I below shows the width of the patch and the slippage of the patch at the end of the procedure.

Further experiments under identical conditions except using a patch member 8 inches wide show that under these circumstances, patch slippage is completely eliminated.

Further experiments under identical conditions except that the patch member is an 8 inch wide glass-fiber reinforced sheet as disclosed in application Ser. No. 664,275 results in the sheet recovering in such a fashion that it slips out of contact with the patch, exposing the substrate.

| Sheet No. | Thickness Before Expansion (in mils) | Recovery Force (pli) | Expansion Ratio | Modulus (psi) | Patch Slippage (inches) | Final Patch Width (inches) |
|---|---|---|---|---|---|---|
| 1 | 43 | 0.9 | 1.5 | 35 | 1/16-¼ | 6¾-7 |
| 2 | 43 | 1.2 | 1.7 | 36 | ⅛-½ | 6⅜-7¾ |
| 3 | 43 | 1.6 | 2.0 | 35 | ¼-⅞ | 7½ |
| 4 | 43 | 1.7 | 2.0 | 36 | ¼-⅞ | 7 |
| 5 | 60 | 2.5 | 2.0 | 38 | ¼-1¼ | 6¾-8½ |
| 6 | 60 | 2.6 | 2.0 | 40 | 3/16-½ | 7¾-8½ |
| 7 | 60 | 3.3 | 2.5 | 38 | ¼-1⅛ | 8-8½ |
| 8 | 60 | 4.3 | 3.3 | 36 | ¼-⅞ | 8¼-8⅞ |
| 9 | 82 | 3.9 | 3.2 | 25 | ¼-1 | 8 |
| 10 | 82 | 4.9 | 3.8 | 26 | ¼-¾ | 8½ |
| 11 | 82 | 4.9 | 4.0 | 25 | ¼-¾ | 8¾ |
| 12 | 82 | 5.9 | 4.8 | 25 | ⅛-⅞ | 8⅞ |

EXAMPLE 2

The procedure of Example 1 is followed except that (1) the sheet closure member was 12 inches by 52 inches and has an expansion ratio of about 1.3 and an $M_{100}$ modulus at 150° C. of 35 psi, (2) the patch member is 6 inches wide and 12 inches long, (3) the pipe has an outer diameter of 16. inches and the collar has an outer diameter of 18 inches, and the sheet when wrapped affords an overlap of about 3 inches. The patch stretches by about 15% in width and does not slip.

EXAMPLE 3

The procedure of Example 2 is repeated except that the patch member is only 4 inches wide. A similarly satisfactory result is obtained. However, use of a 4 inch wide glass-fiber reinforced patch as described in application Ser. No. 664,275 results in failure, the sheet recovering to such an extent that it slips out of contact with the patch, exposing the substrate.

EXAMPLE 4

The procedure of Example 2 is repeated with a series of pipes of varying diameter except that the patch member is only 2 inches wide and the substrate is a pipe of uniform diameter 2, 6, 8, 14 or 48 inches. A satisfactory result is obtained in all cases.

EXAMPLE 5

The patch member of this Example is 1½ inches long and 4 inches wide and consists of a 20 mil thick sheet of cross-linked high density polyethylene having a modulus at 150° C. of 85 psi and having adherent to one side thereof a 25 mil thick layer of a cross-linked hot melt adhesive as described in Example 1.

The closure member is a uniformly expanded sheet of cross-linked high density polyethylene, 82 mil thick and 1½ inch long, and having a modulus at 150° C. of 25 psi and an expansion ratio of 4.8:1. The sheet has a coating 60 mils thick of a mastic on one surface thereof. The substrate is a steel pipe having an outer diameter of 4 inches and a thickness of 30 mils. The closure member is wrapped around the substrate, with the mastic coating on the inside and with an overlap of about 4 inches. The patch is then placed symmetrically over the exposed edge of the overlapping portion sheet and heated by means of a flameless heat gun until the patch adhesive has reached its tack point and bonded the patch to the sheet; the patch is pressed against the sheet by hand using an insulated glove during the heating. The remainder of the sheet is then heated to cause recovery thereof. The ends of the sheet remain overlapping, with the patch covering the overlap area.

EXAMPLE 6

The procedure of Example 5 is followed except that the sheet closure member had no mastic coating in the overlap area. A similar satisfactory result is obtained.

EXAMPLE 7

The patch member used in this Example is 4 inches long and 2½ inches wide and consists of a 25 mil thick sheet of cross-linked high density polyethylene having a modulus at 150° C. of 55 psi and having adherent thereto a layer 25 mils thick of a cross-linked hot melt adhesive as described in Example 1. The closure members are uniformly expanded sheets of cross-linked high density polyethylene, 4 inches long. Table II below shows the modulus at 150° C, the expansion ratio and the thickness before expansion of each of the sheets. All the sheets have a coating 60 mils thick of a mastic on one surface thereof. The substrate consists of a solid aluminum cylinder having an outer diameter of 1½ inches and mounted concentrically on the center of the cylinder, a cylindrical aluminum collar 1 inch long and having an outer diameter of 3 inches. The closure member is wrapped around the substrate including the collar, with the mastic coating on the inside and with the collar in the middle of the sheet, and with an overlap of about 6 inches. The patch is then placed symmetrically over tne exposed edge of the overlapping portion of the sheet and heated by means of a flameless heat gun until the adhesive has reached its tack point and bonded the patch to the sheet; the patch is pressed against the sheet by hand using an insulated glove during the heating. The remainder of the sheet is then heated to cause recovery thereof. When using Sheet No. 4, the patch slips out of contact with the sheet due to the generally small diameter of the substrate, the sharp transition and the high recovery force of the closure sheet, but in the other runs a satisfactory result is obtained.

TABLE II

| Sheet No. | Thickness before expansion (mils) | Expansion Ratio Expansion Ratio | Modulus (psi) | Recovery Force (pli) |
|---|---|---|---|---|
| 1 | 15 | 3 | 15 | 0.45 |
| 2 | 15 | 3 | 55 | 1.5 |
| 3 | 40 | 8 | 15 | 2.9 |
| 4 | 40 | 3 | 55 | 3.9 |

The values for tensile strength and elongation given in this specification and in the appended claims are measured by the method of ASIM D-638. The values for modulus at 150° C. are measured by the following test, which measures the stress reguired to elongate the article by 100% at 150° C. Marks separated by 1 inch (2.54 cm) are placed on the center section of a die-cut specimen and the sample is hung vertically in an oven maintained at 150° C., with a 2 gm. weight attached to the lower end of the sample. After equilibrating for 2 minutes, the weight attached to the lower end of the sample is increased until the distance between the marks has increased by 100%. The modulus (also known as the $M_{100}$ value) is then calculated from the expression $$\text{Modulus} = \frac{\text{stress}}{\text{initial cross} - \text{sectional area}}$$

Lap shear is determined in accordance with the method of ASTM D-1002 with the modification that the thickness of the adhesive in the determination is egual to the thickness of adhesive to be used in the arrangement, and the further modification that the composition of the substrates used in the determination are the same as those of the patch member and the closure member of the arrangement of the invention.

The peel strength is determined by heat-recovering a sheet of polymeric materials to be used for the cover member about a drum of 25 mm length and 25 mm diameter so that the polymeric material covers, and is bonded to, the entire circumference of the drum. The surface of polymeric material is cleaned and degreased and strip of the material to be used for the patch member approximately 50 mm in length is wrapped around the drum with the layer of adhesive interposed between them, and the assembly is heated in an oven at 150° C. for 20 minutes to bend the two materials together. The drum is then mounted with its axis horizontal so that it is freely rotatable and the outer layer of material is peeled off in a radial direction it a rate of 50 ±5 mm per minute and 23°±2° C. using a suitable tensile test apparatus, the force required to peel the material being recorded as the peel strength.

I claim:
1. A process of covering a substrate which comprises
   (1) overlappingly wrapping a heat-shrinkable polymeric closure member in sheet form around an elongate substrate;
   (2) placing a crosslinked polymeric patch member over the exposed edge and outwardly disposed adjacent portions of the sheet in the area of the overlap; said patch member having a thickness of from about 10 to about 100 mils, a modulus at 150° C. of from about 10 to about 200 psi and an elongation at 150° C. of from about 10 to about 1000%;
   (3) interposing between the closure and patch members a layer of a hot melt adhesive 5 to 100 mils thick; said adhesive being from about 5 to about 100 mils thick having a lap shear strength at 150° C. of from about 0.3 to about 20 psi, a peel strength of at least 5 pli, a melt viscosity at 150° C. of at least about $10^2$ poise and a tack temperature which is below the recovery temperature of said closure member;
   (4) heating the said hot melt adhesive to its tack temperature and pressing the patch member against the closure member, thereby bonding them together; and
   (5) heating the closure member to cause shrinkage thereof into circumferential contact with the substrate to conform generally to the shape of the substrate causing the patch member to stretch by at least 5% in the direction of shrinkage.

the method being carried out under conditions such that (a) said patch member remains bonded to said closure member throughout at least the major portion of its length in the overlap area; and (b) at least part of said patch member is stretched by at least about 5% up to about 50% in the transverse direction.

2. A process in accordance with claim 1 wherein said hot melt adhesive has a lap shear strength at 150° C. of from about 1 to about 12 psi.

3. A process in accordance with claim 1 wherein said hot melt adhesive has a melt viscosity at 150° C. greater than about $10^4$ poise.

4. A process in accordance with claim 1 wherein said hot melt adhesive has a tack temperature below about 140° C.

5. A process in accordance with claim 1 wherein said hot melt adhesive is present in a layer having a thickness of about 10 to about 20 mils.

6. A process in accordance with claim 1 wherein said adhesive is a cross-linked adhesive having a gel content of at least 1%.

7. A proces in accordance with claim 1 wherein said patch member has a modulus at 150° C. of from about 50 to about 150 psi.

8. A process in accordance with claim 1 wherein said patch member has an elongation at 150° C. of from about 50% to about 200%.

9. A process in accordance with claim 1 wherein said patch member has adherent thereto said layer of hot melt adhesive.

10. A process in accordance with claim 1 wherein said patch member is a polymeric material when heated in the absence of restraint undergoes a maximum dimensional change independently in the longitudinal and transverse direction of from −10% to +10%.

11. A process in accordance with claim 1 wherein said patch member has a thickness of from about 15 to about 30 mils.

12. A process in accordance with claim 1 wherein said patch member has a thickness less than the pre-recovery thickness of said closure member.

13. A process in accordance with claim 1 wherein said patch member is characterized in that the product of its thickness multiplied by its modulus at 150° C. is from about 0.2 times to about 20 times the maximum recovery force of the closure member.

14. A process in accordance with claim 1 wherein said closure member has a thickness of from about 10 to 150 mils.

15. A process in accordance with claim 1 wherein said closure member has a circumferential expansion ratio of from 1.1 to 10.

16. A process in accordance with claim 1 wherein said closure member has a modulus at 150° C. of from 2 to 200 psi.

17. A process in accordance with claim 1 wherein said closure member has a recovery force of from 0.1 to 20 pli.

18. A process in accordance with claim 1 wherein said closure member is uniaxially expanded in the direction transverse to the longitudinal axis of the substrate.

19. A process in accordance with claim 1 wherein said closure member comprises polyethylene.

20. A process in accordance with claim 1 wherein said closure member has applied to the inwardly disposed surface thereof a layer of a mastic or hot melt adhesive.

* * * * *

UNITED STATES PATENT AND TRADEMARK OFFICE
CERTIFICATE OF CORRECTION

PATENT NO. : 4,586,971
DATED : May 6, 1986
INVENTOR(S) : BARNIE A. WALLACE

It is certified that error appears in the above-identified patent and that said Letters Patent are hereby corrected as shown below:

Col. 2, line 48, delete "forms" and insert in lieu thereof -- form --.

Col. 3, line 6, delete "10 to 2 mils" and insert in lieu thereof -- 10 to 20 mils --.

Col. 4, line 22, delete "bearing" and insert in lieu thereof -- Bearing --.

Col. 5, line 12, delete "egual" and insert in lieu thereof -- equal --.

Col. 6, line 68, after weight insert a comma -- , --.

Signed and Sealed this

Twenty-third Day of September 1986

[SEAL]

Attest:

DONALD J. QUIGG

Attesting Officer

Commissioner of Patents and Trademarks